(12) United States Patent
 Morris et al.

(10) Patent No.: US 10,112,133 B2
(45) Date of Patent: Oct. 30, 2018

(54) FILTER HOUSING WITH END CAP SEAL

(71) Applicant: Caterpillar Inc., Peoria, IL (US)

(72) Inventors: Bryant Morris, Peoria, IL (US); Mark McElroy, Mapleton, IL (US)

(73) Assignee: Caterpillar Inc., Deerfield, IL (US)

( * ) Notice: Subject to any disclaimer, the term of this patent is extended or adjusted under 35 U.S.C. 154(b) by 405 days.

(21) Appl. No.: 14/803,506

(22) Filed: Jul. 20, 2015

(65) Prior Publication Data

US 2017/0021291 A1    Jan. 26, 2017

(51) Int. Cl.
| | | |
|---|---|---|
| *B01D 27/08* | (2006.01) | |
| *B01D 29/15* | (2006.01) | |
| *B01D 35/00* | (2006.01) | |
| *B01D 35/30* | (2006.01) | |
| *B01D 46/24* | (2006.01) | |
| *B01D 46/42* | (2006.01) | |

(52) U.S. Cl.
CPC .......... *B01D 35/005* (2013.01); *B01D 27/08* (2013.01); *B01D 29/15* (2013.01); *B01D 35/306* (2013.01); *B01D 46/2414* (2013.01); *B01D 46/4227* (2013.01); *B01D 2201/291* (2013.01); *B01D 2201/303* (2013.01); *B01D 2201/4046* (2013.01)

(58) Field of Classification Search
CPC ...... B01D 35/005; B01D 27/08; B01D 29/15; B01D 46/2414; B01D 35/306; B01D 46/4227; B01D 2201/4046; B01D 2201/291; B01D 2201/303
See application file for complete search history.

(56) References Cited

U.S. PATENT DOCUMENTS

| | | | | | |
|---|---|---|---|---|---|
| 3,908,693 | A | * | 9/1975 | Cooper | .................. B01D 35/02 137/493 |
| 3,909,414 | A | * | 9/1975 | Drath | ................... B01D 29/117 210/232 |
| 4,925,466 | A | * | 5/1990 | Overby | .............. B01D 46/0004 55/319 |
| 5,520,801 | A | * | 5/1996 | Gerber | .................. B01D 29/15 210/130 |

(Continued)

FOREIGN PATENT DOCUMENTS

| | | |
|---|---|---|
| DE | 102009015094 | 10/2010 |
| EP | 1216740 | 6/2002 |

(Continued)

OTHER PUBLICATIONS

Oxford Dictionary, "cover". defintion, Mar. 31, 2018, https://web.archive.org/web/20180331172143/https://en.oxforddictionaries.com/definition/cover (Year: 2018).*

*Primary Examiner* — Amber R Orlando
*Assistant Examiner* — Brit E. Anbacht
(74) *Attorney, Agent, or Firm* — Law Office of Kurt J. Fugman LLC (57) ABSTRACT

A filter assembly includes a filter element, a cap, and a base seal. The filter element has a first end, a second end, an outer surface, and an inside passage. The cap is affixed to the first end. The cap has a cap perimeter configured to mate with an opening of a filter housing. The base seal is disposed at the second end. The base seal has an outlet port in cooperative alignment with the inside passage. The base seal is configured to seal the outlet port to a housing outlet and the base seal is configured to seal a housing drain.

23 Claims, 7 Drawing Sheets

(56) References Cited

U.S. PATENT DOCUMENTS

| | | | |
|---|---|---|---|
| 5,695,633 A * | 12/1997 | Ernst | B01D 29/21 210/130 |
| 5,820,646 A | 10/1998 | Gillingham et al. | |
| 5,919,279 A | 7/1999 | Merritt et al. | |
| 6,270,659 B1 * | 8/2001 | Bagci | B01D 29/15 210/111 |
| 6,361,684 B1 * | 3/2002 | Hawkins | B01D 35/18 210/149 |
| 6,447,567 B1 | 9/2002 | Ehrenberg | |
| 6,506,303 B1 * | 1/2003 | Gustafsson | B01D 29/21 210/248 |
| 6,726,738 B1 | 4/2004 | Walker, Jr. | |
| 7,168,573 B2 | 1/2007 | Brown et al. | |
| 7,828,870 B1 | 11/2010 | Rech et al. | |
| 7,918,997 B2 | 4/2011 | Dworatzek et al. | |
| 8,016,922 B2 | 9/2011 | Ehrenberg | |
| 2005/0193695 A1 | 9/2005 | Holmes et al. | |
| 2009/0071111 A1 * | 3/2009 | Lundgren | B01D 46/0046 55/385.4 |
| 2010/0108589 A1 | 5/2010 | Frye et al. | |
| 2011/0005996 A1 | 1/2011 | Jainek | |
| 2011/0303600 A1 | 12/2011 | Honermann et al. | |
| 2013/0193057 A1 | 8/2013 | Honermann et al. | |
| 2013/0213867 A1 | 8/2013 | Agresta et al. | |
| 2014/0021119 A1 | 1/2014 | Malgorn et al. | |
| 2014/0230387 A1 | 8/2014 | Kawabe et al. | |
| 2015/0020488 A1 * | 1/2015 | Dhiman | B01D 46/008 55/502 |
| 2015/0068173 A1 | 3/2015 | Scott et al. | |
| 2015/0101293 A1 * | 4/2015 | Dworatzek | B01D 46/2411 55/423 |
| 2015/0246303 A1 * | 9/2015 | Ben-Shinnon | B01D 35/30 210/248 |
| 2016/0131096 A1 * | 5/2016 | Allott | F02M 37/22 210/437 |
| 2016/0136548 A1 * | 5/2016 | Byun | B01D 35/005 210/435 |
| 2017/0043285 A1 * | 2/2017 | Yu | B01D 35/153 |
| 2017/0120168 A1 * | 5/2017 | Stamey, Jr. | B01D 36/003 |
| 2017/0144091 A1 * | 5/2017 | Wolhowe | B01D 36/003 |
| 2017/0209821 A1 * | 7/2017 | Allott | B01D 35/1475 |
| 2018/0065067 A1 * | 3/2018 | Ardes | B01D 35/147 |

FOREIGN PATENT DOCUMENTS

| | | |
|---|---|---|
| JP | 11276834 A | 10/1999 |
| KR | 20100070801 A | 6/2010 |
| KR | 10-1160706 | 6/2012 |
| WO | 2004009209 A1 | 1/2004 |
| WO | 2013023828 A1 | 2/2013 |

* cited by examiner

FILTER HOUSING WITH END CAP SEAL

TECHNICAL FIELD

This patent disclosure relates generally to a filter assembly and, more particularly, to a filter assembly with an end cap seal.

BACKGROUND

Filter assemblies are known for separating constituents of a mixture, and have been used in various applications, including internal combustion engines, hydraulic systems, and pneumatic systems, for example. These filter assemblies may be used to separate constituents from fluids in fuel systems, lubrication oil systems, hydraulic oil systems, air induction systems, exhaust filtration systems, or other fluid systems. Various structures are known for enclosing a filter element within a housing in an assembly, including canister type assemblies and spin-on type assemblies, for example. Servicing or replacement of filter elements at regular intervals may promote operation of fluid systems, by limiting the fluid pressure drop across filter elements as the filter elements load with constituents removed from the fluid.

U.S. Pat. No. 6,726,738 (hereinafter "the '738 patent"), entitled "Air Filter Assembly," describes a filter assembly with a clasp assembly to connect a filter element to a filter housing. This clasp includes a "V" shaped band that acts to compress flanges on the filter element and filter housing together. Such bands may be subject accidental opening unless secured. Further, the bands may be susceptible to environmental conditions and may therefore rust or otherwise degrade over time.

Accordingly, there is a need for improved filter assemblies to address the problems described above and/or problems posed by other conventional approaches.

It will be appreciated that this background description has been created to aid the reader, and is not to be taken as a concession that any of the indicated problems were themselves known in the art.

SUMMARY

According to an aspect of the disclosure, a filter assembly includes a filter element, a cap, and a base seal. The filter element has a first end, a second end, an outer surface, and an inside passage. The cap is affixed to the first end. The cap has a cap perimeter configured to mate with an opening of a filter housing. The base seal is disposed at the second end. The base seal has an outlet port in cooperative alignment with the inside passage. The base seal is configured to seal the outlet port to a housing outlet and the base seal is configured to seal a housing drain.

According to another aspect of the disclosure, a filter system includes a filter housing and a filter assembly. The filter housing includes a housing opening and a base having a housing outlet and a housing drain. The filter assembly includes a filter element, a cap, and a base seal. The filter element has a first end, a second end, an outer surface, and an inside passage. The cap is affixed to the first end. The cap has a cap perimeter configured to mate with the housing opening. The base seal is disposed at the second end. The base seal has an outlet port in cooperative alignment with the inside passage. The base seal is configured to seal the outlet port to the housing outlet and the base seal is configured to seal the housing drain.

According to yet another aspect of the disclosure, a machine includes an engine and a filter system to filter a fluid for the engine. The filter system includes a filter housing and a filter assembly. The filter housing includes a housing opening and a base having a housing outlet and a housing drain. The filter assembly includes a filter element, a cap, and a base seal. The filter element has a first end, a second end, an outer surface, and an inside passage. The cap is affixed to the first end. The cap has a cap perimeter configured to mate with the housing opening. The base seal is disposed at the second end. The base seal has an outlet port in cooperative alignment with the inside passage. The base seal is configured to seal the outlet port to the housing outlet and the base seal is configured to seal the housing drain.

The drawings presented are intended solely for the purpose of illustration and therefore, are neither desired nor intended to limit the subject matter of the disclosure to any or all of the exact details of construction shown, except insofar as they may be deemed essential to the claims.

DETAILED DESCRIPTION

Figure 1:
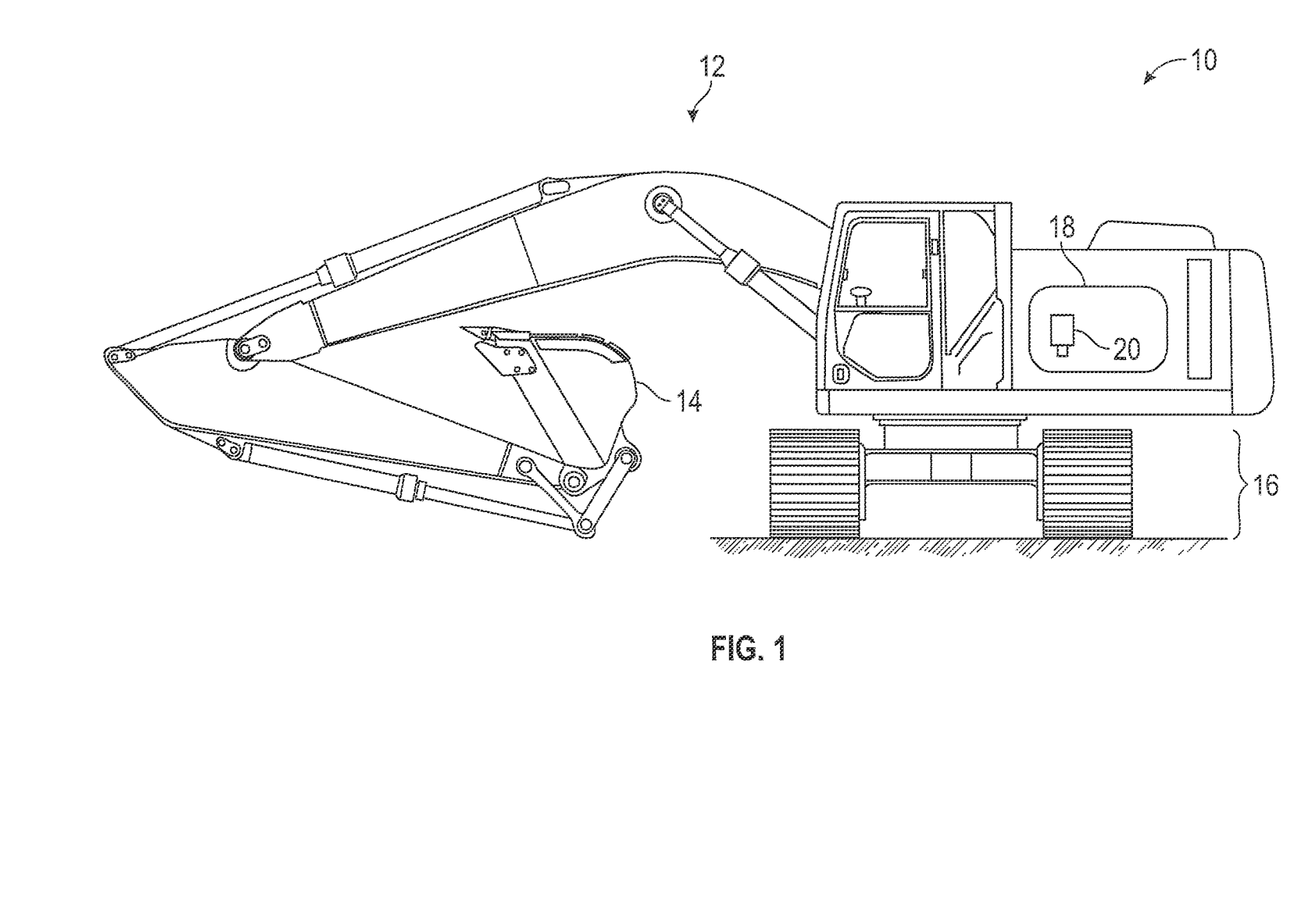
FIG. 1 is a side view of an exemplary machine, according to an aspect of the disclosure.

FIG. 1 illustrates an exemplary machine 10 having various systems and components that cooperate to accomplish a task. The machine 10 may embody a fixed or mobile machine that performs some type of operation associated with an industry such as mining, construction, farming, transportation, power generation, or another industry known in the art. For example, the machine 10 may be an earth moving machine such as an excavator (shown in FIG. 1), a dozer, a loader, a backhoe, a motor grader, a dump truck, or another earth moving machine. The machine 10 may include an implement system 12 configured to move a work tool 14, a drive system 16 for propelling the machine 10, and a power source 18.

In a particular example, the power source 18 includes an engine configured to burn a fuel such as diesel fuel, and the engine is lubricated with oil or another lubricant. This lubricant is filtered through a filter system 20. As lubricant flows through the filter system 20, contaminants such as debris and the like are separated from the lubricant and collected in the filter system 20. Periodically, the filter system 20 is inspected to determine if a filter medium (described further herein) disposed within the filter system 20 should be cleaned or replaced. For example, if sufficient debris has collected on the filter medium, the filter medium may be cleaned or replaced. Aspects of the filter system 20 described herein beneficially simplify inspection and replacement of a filter medium disposed within the filter system 20, and in turn help to reduce time and expense to maintain a corresponding fluid system compared to conventional approaches. While particular example is made throughout of filtering lubricant, the various aspects are not limited to filtering lubricant, but rather, include any suitable filtering application. Examples of suitable filtering applications include filtration of hydraulic fluid, fuel, air, or any other filtration applications known in the art.

Figure 2:
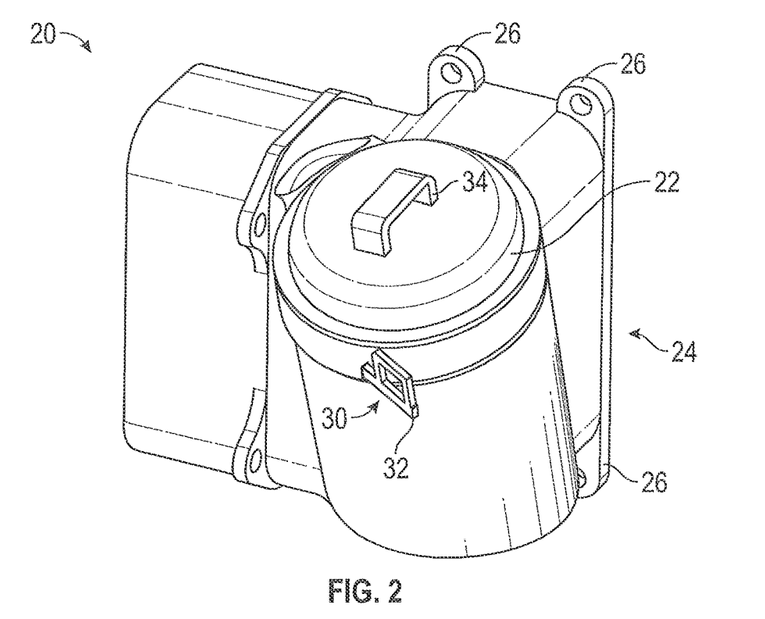
FIG. 2 is a perspective view of an exemplary filter system, according to an aspect of the present disclosure.
Figure 3:
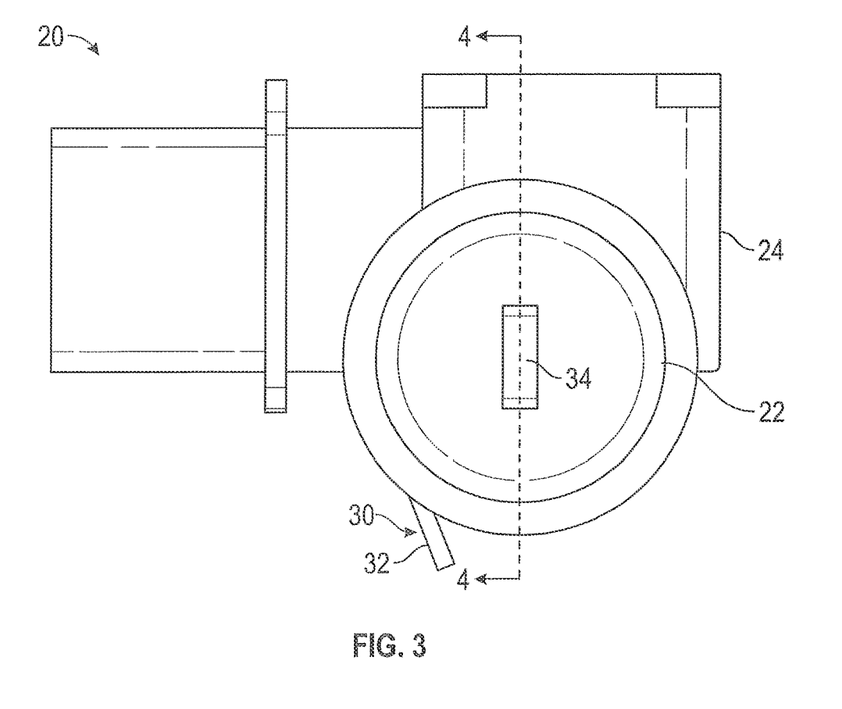
FIG. 3 is a top view of the filter system shown in FIG. 2.

FIGS. 2 and 3 illustrate a perspective and top view of an exemplary filter system 20 according to an aspect of the disclosure. Although the filter system 20 shown in FIGS. 2 and 3 is embodied as a cartridge type filter assembly, it will be appreciated that the filter system 20 may embody any type of filter assembly known in the art to suit a particular application. The filter system 20 may be used in equipment such as internal combustion engines, pneumatic systems, hydraulic systems, and the like. The filter system 20 may be used in various industrial applications, for example, construction, mining, transport, power generation, or any other industrial applications known in the art. The filter system 20 may be used to filter contaminants from fluids in fuel systems, lubrication oil systems, hydraulic fluid power systems, hydraulic fluid control systems, transmission systems, engine air intake systems, engine exhaust systems, or any other fluid systems known in the art. Further, the filter system 20 may be used to filter diesel, gasoline, hydraulic or lubrication oil, or any other liquids. In other aspects, the filter system 20 may be used as a water/fuel separator. Moreover, the filter system 20 may also be used to filter air, exhaust gases, or any other gaseous fluids.

The filter system 20 includes a cap 22, and a housing 24 detachably coupled to the cap 22. As shown in FIGS. 2 and 3, the cap 22 is circular and the housing 24 includes a substantially cylindrical portion to receive a filter element, however, it will be appreciated that the shapes of the cap 22 and the housing 24 are merely exemplary and may be varied without deviating from the scope of the claimed subject matter. For example, the cap 22 and the housing 24 may have non-circular shapes, such as polygons, ellipses, or any other non-circular shapes known in the art. In various examples, the cap 22 and/or housing 24 may include any suitable material including metals, polymers, resins, or other suitable materials known in the art. These and other materials may be cast, punched, pressed, machined, or otherwise formed in any suitable manner.

The filter system 20 may be mounted to the power source 18 or machine 10 via one or more mounting flanges 26. According to various examples, the cap 22 may be secured to the housing 24 in any suitable manner. In the particular example shown in FIG. 2, the cap 22 and housing 24 are secured via a cord member 30. To facilitate removing the cord member 30 and releasing the cap 22 from the housing 24, the cord member 30 may include a grasping portion 32. To facilitate removing the cap 22 after being released from the housing 24, the cap 22 may include a handle 34.

Figure 4:
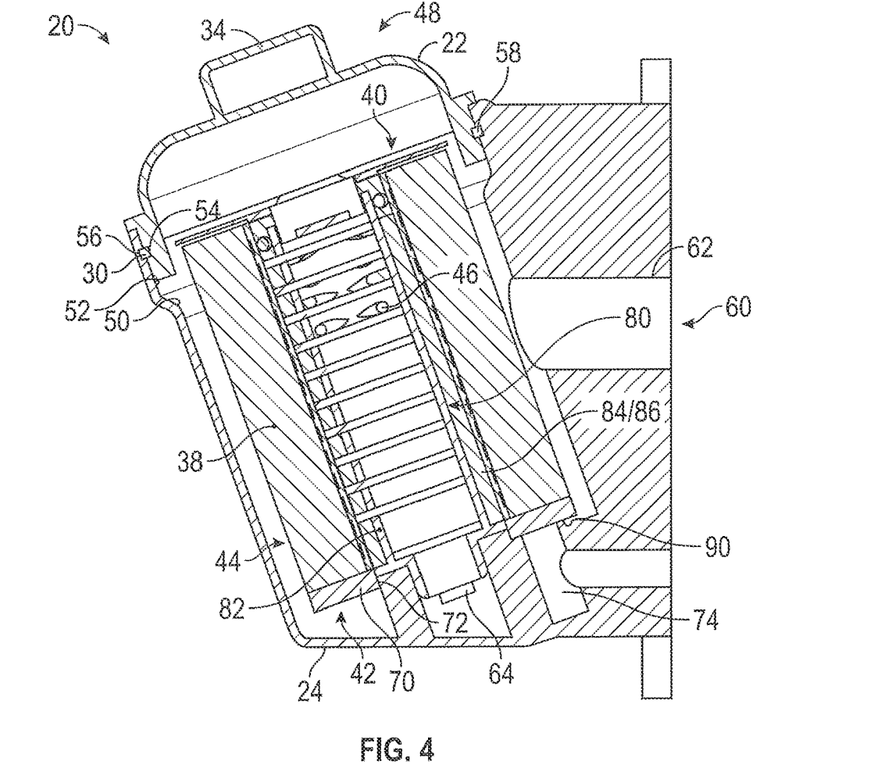
FIG. 4 is a cross sectional view along section 3-3 of the filter system shown in FIG. 2.

FIG. 4 is a side sectional view 4-4 of the filter system 20. As shown in FIG. 4, the filter system 20 includes a filter element 38. The filter element 38 includes a first end 40, a second end 42, an outside surface 44, and an inside passage 46. The filter element 38 is shown as a cartridge-type filter that is affixed to the cap 22 to form a filter assembly 48 (shown in FIG. 5). The filter assembly 48 is sealed within an opening 50 of the housing 24 via a gasket 52.

To secure the filter assembly 48 in the opening 50, a first groove 54 disposed about the cap 22 is aligned with a second groove 56 disposed about the opening 50. Once in alignment, the first groove 54 and second groove 56 form a channel 58. The cord member 30 may be inserted into the channel 58 to secure the filter assembly 48 in the opening 50.

In operation, a flow of fluid 60 enters the housing 24 via an inlet 62, is filtered as it flows through the outside surface 44 to enter the inside passage 46, and exits the housing 24 via an outlet 64. The filter assembly 48 includes a base seal 70 having an outlet port 72 that is in cooperative alignment with the inside passage 46 and configured to fluidly couple the inside passage 46 to the outlet 64 and seal the outlet from the flow of fluid 60 that has not yet flowed through the filter element 38.

The housing 24 also includes a drain 74 that may be sealed by the base seal 70. In response to the filter assembly 48 being installed in the housing 24, the drain 74 is sealed by the base seal 70. In response to the filter assembly 48 being removed from the housing 24, the drain 74 is open. In response to being opened, the drain 74 may provide an outlet for fluid in the housing 24 to drain into a sump or other tank (not shown). In addition, the drain 74 may provide a vacuum brake to reduce the formation of a partial vacuum forming between the filter assembly 48 and the housing 24 and thus, facilitates removal of the filter assembly 48 from the housing 24.

Optionally, the filter system 20 may include an indexing device 80 to selectively allow the filter assembly 48 to be installed in the housing 24 in a particular orientation. The indexing device 80 may include any suitable structure or geometry selectively allow the filter assembly 48 to be installed in the housing 24 in the particular orientation. In a specific example, the housing 24 includes a basket 82 extending out from the outlet 64. The basket 82 is configured to slide into the inside passage 46 and is sufficiently porous to allow the flow of fluid 60. The basket 82 includes an indexing groove 84 (shown in FIG. 5) that is configured to mate with an indexing spline 86 disposed in the inside passage 46 (shown in FIG. 6). If present, the indexing device 80 orients a drain seal 90 in cooperative alignment with the drain 74.

Figure 5:
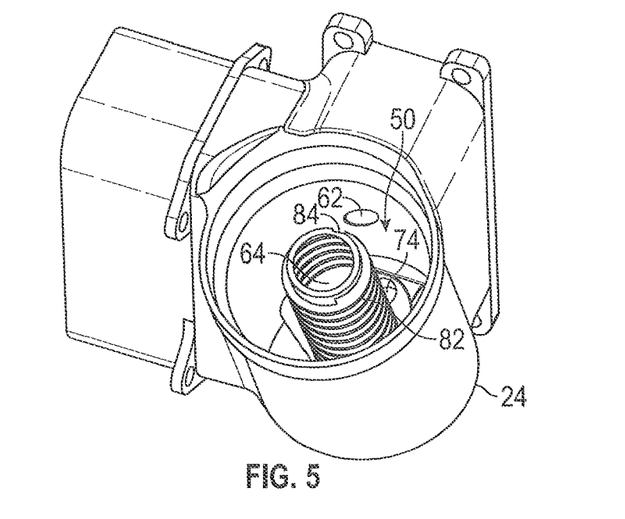
FIG. 5 is a perspective view of the filter housing shown in FIG. 2.

FIG. 5 is a perspective view of the housing 24 of FIG. 2. As shown in FIG. 5, if present, the basket 82 extends up from the outlet 64 and includes the indexing groove 84. Also shown in FIG. 4, with the filter assembly 48 removed, the drain 74 is open to allow the flow of fluid 60 to drain out of the housing 24 via gravity, for example.

Figure 6:
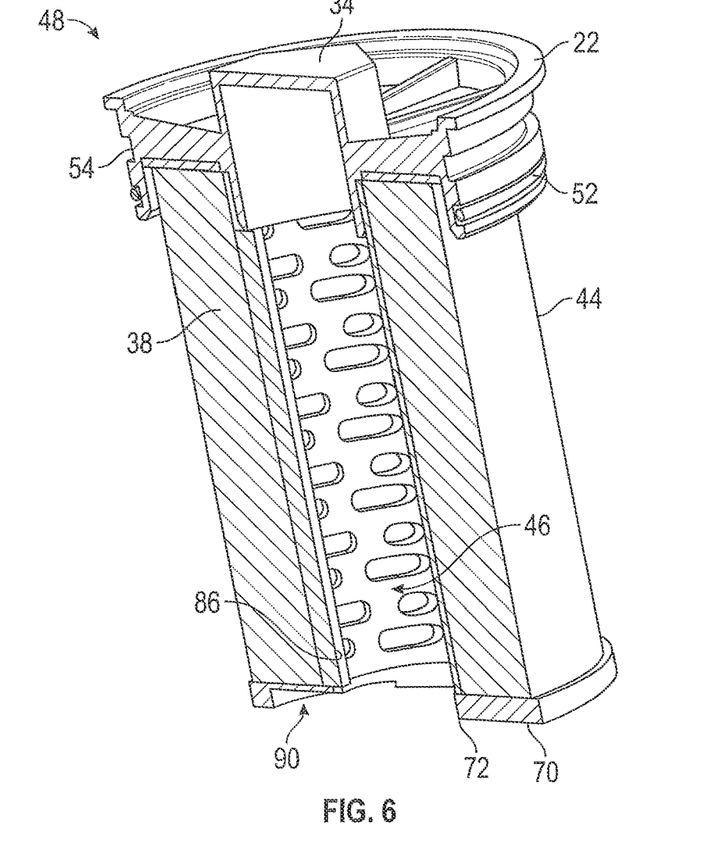
FIG. 6 is a perspective sectional view of the filter assembly shown in FIG. 2.

FIG. 6 is a perspective side sectional view of the filter assembly 48 of FIG. 2. Referring to FIGS. 5 and 6, the drain seal 90 includes a structure to mate with the drain 74. In the particular example shown, the drain seal 90 includes a recessed area in the base seal 70 and the shape of the drain seal 90 is configured to match the area around the drain 74. The indexing spline 86 is configured to engage the indexing groove 84 to selectively allow the filter assembly 48 to be installed in the housing 24 in the particular orientation.

Figure 7:
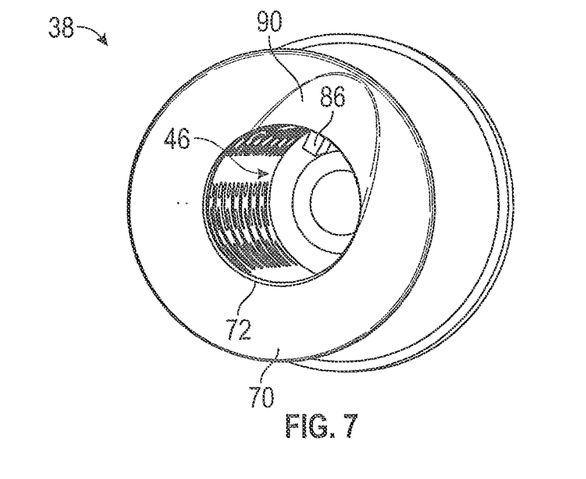
FIG. 7 is a perspective bottom view of the filter element shown in FIG. 2.

FIG. 7 is a perspective bottom view of the filter element 38 of FIG. 2. Referring to FIGS. 5 and 7, the drain seal 90 includes a structure to mate with the drain 74. In the particular example shown, the drain seal 90 is a lobed recessed area in the base seal 70. However, in other examples, the drain seal 90 may be rectangular, triangular, circular, or other suitable shape and the shape of the area around the drain 74 is configured to match this shape. Again, the indexing spline 86 is configured to engage the indexing groove 84 to selectively allow the filter assembly 48 to be installed in the housing 24 in the particular orientation.

Figure 8:
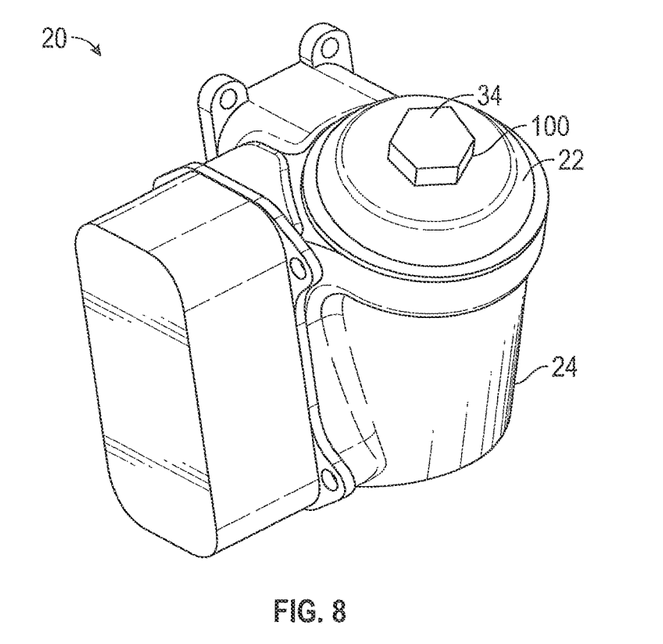
FIG. 8 is a perspective view of an exemplary filter system, according to another aspect of the disclosure.
Figure 9:
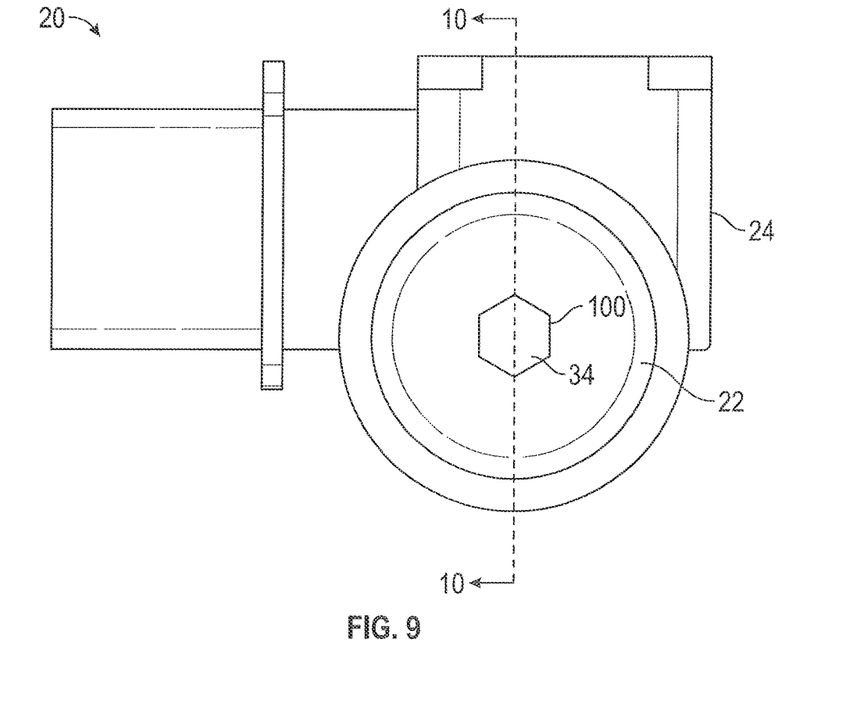
FIG. 9 is a top view of the filter system shown in FIG. 8.
Figure 10:
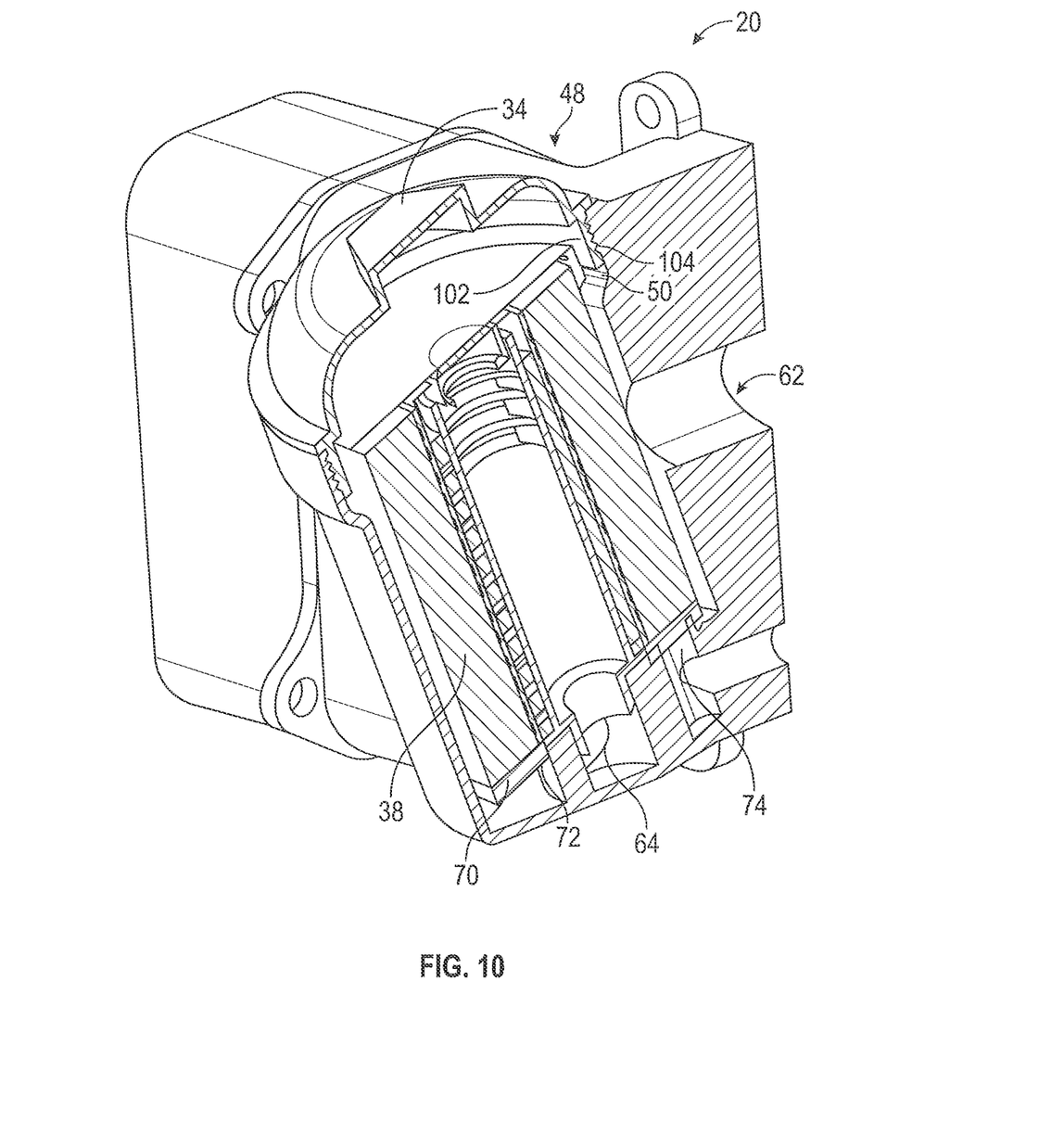
FIG. 10 is a side sectional view 8-8 of the filter system shown in FIG. 8.

FIGS. 8 and 9 are a perspective view and a top view of the exemplary filter system 20 according to another aspect of the present disclosure. The filter system 20 of FIGS. 8-12 is similar to the filter system 20 of FIGS. 2-7 and thus, for the sake of brevity, those elements already described will not be described again. Referring to FIGS. 8 and 10, the filter system 20 includes a threaded connection to secure the cap 22 to the housing 24 and the handle 34 includes a plurality of torqueing surfaces 100 configured to facilitate rotation of the cap 22 to install and remove the filter assembly 48. In the particular example shown in FIG. 10, the cap 22 includes a threaded portion 102 disposed about the perimeter of the cap 22 and the opening 50 includes a threaded portion 104 configured to mate with the threaded portion 102. Optionally, a gasket (not shown) may be disposed between the perimeter of the cap 22 and the opening 50 to facilitated forming a seal.

Figure 11:
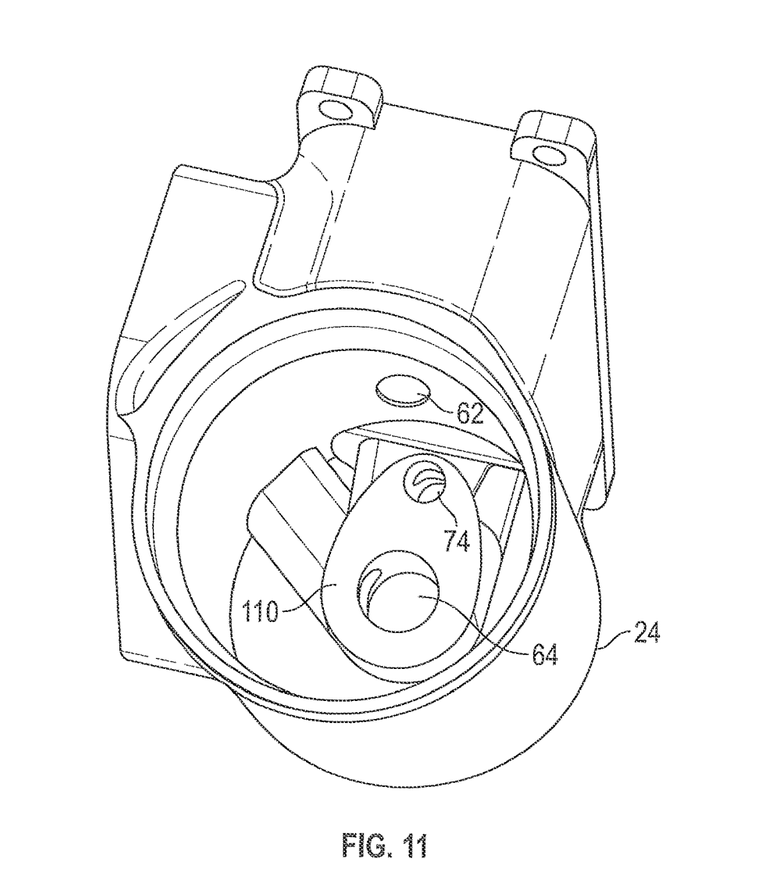
FIG. 11 is a perspective view of a filter housing shown in FIG. 8.
Figure 12:
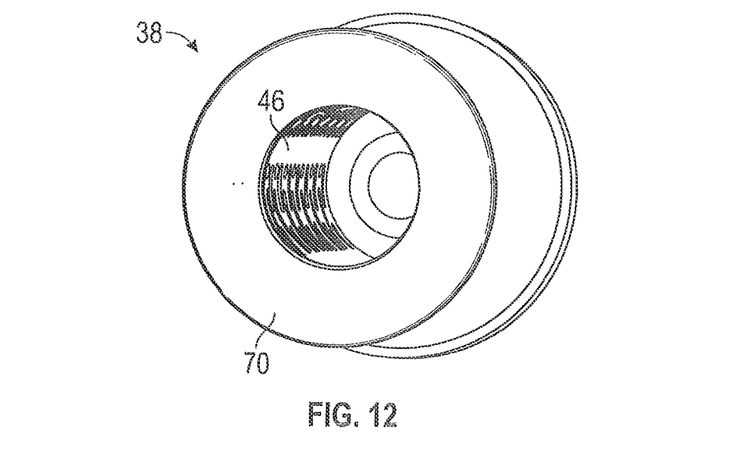
FIG. 12 is a perspective bottom view of the filter element shown in FIG. 8.

FIG. 11 is a perspective view of the housing 24 of FIG. 8. As shown in FIG. 11, a sealing surface 110 is disposed about the outlet 64 and the drain 74. The sealing surface 110 is configured to mate with the base seal 70 shown in FIG. 12. Referring to FIGS. 11 and 12, the base seal 70 and the sealing surface 110 of this example are configured to provide a sliding interface upon which the base seal 70 and the sealing surface 110 can rotate during installation and removal of the filter assembly 48. In this example, the base seal 70 and the sealing surface 110 are both smooth to facilitate rotational sliding without interference.

FIG. 12 is a perspective bottom view of the filter element 38 of FIG. 8. As shown in FIG. 12, the base seal 70 includes a surface suitable for sliding or rotating upon the sealing surface 110 shown in FIG. 11. In addition, the optional indexing spline 86 shown in FIG. 6 is omitted in this example.

INDUSTRIAL APPLICABILITY

The present disclosure may be applicable to any machine including a fluid filter housing having a drain. Aspects of the disclosed filter housing assembly may promote ease of use, greater ability to collect fluid, operational flexibility, and performance of fluid filter housing assemblies in general and lubrication systems in particular.

The industrial applicability of the filter system 20 for filtering fluids and the cord member 30 will be readily understood from the foregoing discussion. The inspection, removal, and replacement of the filter assembly 48 having the cord member 30 may be performed without tools. That is, the cord member 30 may be grasped by the grasping portion shown in FIG. 2 and removed to allow the filter assembly 48 to be removed from the housing 24. It is an advantage of this tool-less system that a filter removing tool does not need to be stored and secured at a job site. In addition, securing the filter assembly 48 to the housing 24 via the cord member 30 also prevents over-torqueing that can occur with the use of tools.

However, in examples where the use of a filter tool to inspect, remove, and replace the filter assembly 48 is preferable, the threaded connection shown in FIGS. 8-12 may be utilized. In addition, any suitable connection method of securing the filter assembly 48 to the housing 24 may be used. Other examples of suitable connection methods include clips, clamps, and the like. The configuration and the components of the filter system 20 as disclosed herein may be used in any type of filters, such as canister type or spin-on type of filters. The housing 24 and the filter assembly 48 may collectively be called as a replacement component of the filter system 20. Additionally, the filter system 20 is easier to manufacture and more cost efficient than conventional approaches. Furthermore, the filter system 20 as disclosed herein may be utilized in any shape and size of the filter system 20, such as for circular or non-circular filter systems 20.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Throughout the disclosure, like reference numbers refer to similar elements herein, unless otherwise specified.

We claim:

1. A filter assembly comprising:
a filter element having a first end, a second end, an outer surface, and an inside passage;
a cap affixed to the first end, the cap having a cap perimeter configured to mate with an opening of a filter housing; and
a base seal disposed at the second end, the base seal having an outlet port in cooperative alignment with the inside passage, the base seal being configured to seal the outlet port to a housing outlet and the base seal being configured to seal a housing drain by covering the housing drain when the filter element is fully installed, the base seal including a lobed recessed area in the base seal configured to mate with the drain.

2. The filter assembly according to claim 1, further comprising filter media disposed between the first end and the second end and the filter media being configured to filter contaminants from a flow of fluid.

3. The filter assembly according to claim 1, further comprising a threaded cap portion disposed at the cap perimeter, the threaded cap portion being configured to mate with a threaded housing portion to secure the filter assembly in the filter housing.

4. The filter assembly according to claim 1, further comprising:
an annular cap surface disposed at the cap perimeter, the annular cap surface being configured to telescope in a sliding engagement with an annular filter housing surface;
an annular cap groove disposed about the annular cap surface;

an annular filter housing groove disposed about the annular filter housing surface;
a channel formed in response to cooperative alignment of the annular cap groove and the annular filter housing groove; and
a cord member configured to be removably inserted into the channel to secure the cap to the filter housing.

5. The filter assembly according to claim 4, wherein the filter assembly is indexed to engage the filter housing at a single orientation and wherein the base seal include a lobe extending radially outwardly from the outlet port to form a housing drain seal.

6. The filter assembly according to claim 5, further comprising an indexing device to orient the cap and the opening of the filter.

7. The filter assembly according to claim 4, wherein the cord member includes a tapered portion disposed at a distal end of the cord member and configured to provide a mechanical advantage to urge the annular cap groove and the annular filter housing groove into cooperative alignment in response to being inserted therein.

8. The filter assembly according to claim 7, further comprising a groove tapered portion corresponding to the tapered portion to receive the tapered portion.

9. The filter assembly according to claim 7, further comprising a tapered cutout portion disposed near a proximal end of the cord member, the tapered cutout portion corresponding to the tapered portion and configured to receive the tapered portion.

10. The filter assembly according to claim 4, further comprising an access passage to provide the cord member access to the channel.

11. The filter assembly according to claim 4, further comprising a grasping portion disposed at a proximal end of the cord member.

12. A filter system comprising:
a filter housing including:
    a housing opening, and
    a base having a housing outlet and a housing drain; and
a filter assembly including:
    a filter element having a first end, a second end, an outer surface, and an inside passage,
    a cap affixed to the first end, the cap having a cap perimeter configured to mate with the housing opening, and
    a base seal disposed at the second end, the base seal having an outlet port in cooperative alignment with the inside passage, the base seal being configured to seal the outlet port to the housing outlet and the base seal being configured to seal the housing drain by covering the housing drain when the filter element is fully installed, the base seal including a blind recessed area in the base seal configured to mate with the drain.

13. The filter system according to claim 12, further comprising filter media disposed between the first end and the second end and the filter media being configured to filter contaminants from a flow of fluid.

14. The filter system according to claim 12, further comprising a threaded cap portion disposed at the cap perimeter, the threaded cap portion being configured to mate with a threaded housing portion to secure the filter assembly in the filter housing.

15. The filter system according to claim 12, further comprising:

an annular cap surface disposed at the cap perimeter, the annular cap surface being configured to telescope in a sliding engagement with an annular filter housing surface;
an annular cap groove disposed about the annular cap surface;
an annular filter housing groove disposed about the annular filter housing surface;
a channel formed in response to cooperative alignment of the annular cap groove and the annular filter housing groove; and
a cord member configured to be removably inserted into the channel to secure the cap to the filter housing.

16. The filter system according to claim 15, wherein the filter assembly is indexed to engage the filter housing at a single orientation, and wherein the base seal include a lobe extending radially outwardly from the outlet port to form a housing drain seal.

17. The filter system according to claim 16, further comprising an indexing device to orient the cap and the opening of the filter.

18. The filter system according to claim 15, wherein the cord member includes a tapered portion disposed at a distal end of the cord member and configured to provide a mechanical advantage to urge the annular cap groove and the annular filter housing groove into cooperative alignment in response to being inserted therein.

19. The filter system according to claim 18, further comprising a groove tapered portion corresponding to the tapered portion to receive the tapered portion.

20. The filter system according to claim 18, further comprising a tapered cutout portion disposed near a proximal end of the cord member, the tapered cutout portion corresponding to the tapered portion and configured to receive the tapered portion.

21. The filter system according to claim 15, further comprising an access passage to provide the cord member access to the channel.

22. The filter system according to claim 15, further comprising a grasping portion disposed at a proximal end of the cord member.

23. A machine comprising:
an engine; and
a filter system to filter a fluid for the engine, the filter system including:
    a filter housing including:
        a housing opening; and
        a base having a housing outlet and a housing drain;
    a filter assembly including:
        a filter element having a first end, a second end, an outer surface, and an inside passage;
        a cap affixed to the first end, the cap having a cap perimeter configured to mate with the housing opening; and
a base seal disposed at the second end, the base seal having an outlet port in cooperative alignment with the inside passage, the base seal being configured to seal the outlet port to the housing outlet and the base seal being configured to seal the housing drain by covering the housing drain when the filter element is fully installed, the base seal including a blind recessed area in the base seal configured to mate with the drain.

* * * * *